United States Patent
Haritaoglu et al.

(10) Patent No.: US 10,750,248 B1
(45) Date of Patent: Aug. 18, 2020

(54) METHOD AND APPARATUS FOR SERVER-SIDE CONTENT DELIVERY NETWORK SWITCHING

(71) Applicant: Google Inc., Mountain View, CA (US)

(72) Inventors: Ismail R. Haritaoglu, Palo Alto, CA (US); Oztan Harmanci, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/590,999

(22) Filed: May 9, 2017

Related U.S. Application Data (60) Provisional application No. 62/334,064, filed on May 10, 2016.

(51) Int. Cl.
| | |
|---|---|
| *H04N 21/647* | (2011.01) |
| *H04N 21/4405* | (2011.01) |
| *H04N 21/45* | (2011.01) |
| *H04N 21/482* | (2011.01) |
| *H04N 21/462* | (2011.01) |

(52) U.S. Cl.
CPC ... *H04N 21/64723* (2013.01); *H04N 21/4405* (2013.01); *H04N 21/4524* (2013.01); *H04N 21/4622* (2013.01); *H04N 21/4825* (2013.01)

(58) Field of Classification Search
CPC ......... H04N 21/64723; H04N 21/4405; H04N 21/4524; H04N 21/4622; H04N 21/4825
See application file for complete search history.

(56) References Cited

U.S. PATENT DOCUMENTS

| | | |
|---|---|---|
| 5,513,260 A | 4/1996 | Ryan |
| 5,577,135 A | 11/1996 | Grajski et al. |
| 5,659,613 A | 8/1997 | Copeland et al. |
| 5,668,603 A | 9/1997 | Copeland |
| 5,721,788 A | 2/1998 | Powell et al. |
| 5,883,959 A | 3/1999 | Kori |
| 5,917,943 A | 6/1999 | Washizawa |
| 6,018,374 A | 1/2000 | Wrobleski |
| 6,026,189 A | 2/2000 | Greenspan |
| 6,173,275 B1 | 1/2001 | Caid et al. |
| 6,373,960 B1 | 4/2002 | Conover et al. |
| 6,381,367 B1 | 4/2002 | Ryan |

(Continued)

FOREIGN PATENT DOCUMENTS

| | | |
|---|---|---|
| CN | 101325687 A | 12/2008 |
| CN | 101589617 A | 11/2009 |

(Continued)

OTHER PUBLICATIONS

D. G. Lowe, "Object Recognition from Local Scale-Invariant Features", in International Conference on Computer Vision, vol. 2, 1999, pp. 1-8.

(Continued)

*Primary Examiner* — John R Schnurr
(74) *Attorney, Agent, or Firm* — Lowenstein Sandler LLP (57) ABSTRACT

A computer implemented method and apparatus for dynamically switching video segment locations (CDNS) during live content/ad manipulation in a completely transparent way to video players. The computer implemented method and apparatus is configured to use a per-user video manifest delivery to track CDN performance based on CDN switch logic from received manifest/playlist requests.

20 Claims, 5 Drawing Sheets

(56) References Cited

U.S. PATENT DOCUMENTS

| | | | |
|---|---|---|---|
| 6,404,925 B1 | 6/2002 | Foote et al. |
| 6,438,275 B1 | 8/2002 | Martins et al. |
| 6,539,395 B1 | 3/2003 | Gjerdingen et al. |
| 6,711,293 B1 | 3/2004 | Lowe |
| 6,774,917 B1 | 8/2004 | Foote et al. |
| 6,785,815 B1 | 8/2004 | Serret-Avila et al. |
| 6,937,766 B1 | 8/2005 | Wilf et al. |
| 6,975,746 B2 | 12/2005 | Davis et al. |
| 6,975,755 B1 | 12/2005 | Baumberg |
| 7,043,019 B2 | 5/2006 | Tehranchi et al. |
| 7,055,169 B2 | 5/2006 | Delpuch et al. |
| 7,167,574 B2 | 1/2007 | Kim |
| 7,177,470 B2 | 2/2007 | Jasinschi et al. |
| 7,185,201 B2 | 2/2007 | Rhoads et al. |
| 7,218,754 B2 | 5/2007 | Schumann et al. |
| 7,272,240 B2 | 9/2007 | Goldberg et al. |
| 7,298,930 B1 | 11/2007 | Erol et al. |
| 7,325,013 B2 | 1/2008 | Caruso |
| 7,421,376 B1 | 9/2008 | Caruso et al. |
| 8,160,366 B2 | 4/2012 | Nakamura et al. |
| 8,200,021 B2 | 6/2012 | Iwamoto et al. |
| 8,515,212 B1 | 8/2013 | Bengio et al. |
| 8,515,241 B2 | 8/2013 | Forsyth et al. |
| 8,607,283 B2 | 12/2013 | Civanlar et al. |
| 8,677,428 B2 | 3/2014 | Lewis et al. |
| 8,887,215 B2 | 11/2014 | Fisher et al. |
| 8,943,215 B2 | 1/2015 | Patten et al. |
| 9,015,151 B1 | 4/2015 | Margulis et al. |
| 9,066,115 B1 | 6/2015 | Cherry et al. |
| 9,066,138 B1 | 6/2015 | Kraiman et al. |
| 9,167,278 B2 | 10/2015 | Sinha et al. |
| 9,491,499 B2 | 11/2016 | Wagenaar et al. |
| 9,613,042 B1 | 4/2017 | Joseph et al. |
| 10,104,137 B2 | 10/2018 | Salomons |
| 10,148,716 B1 | 12/2018 | Joseph et al. |
| 2002/0159641 A1 | 10/2002 | Whitney et al. |
| 2003/0005454 A1 | 1/2003 | Rodriguez et al. |
| 2003/0033347 A1 | 2/2003 | Bolle et al. |
| 2003/0045954 A1 | 3/2003 | Weare et al. |
| 2003/0151621 A1 | 8/2003 | McEvilly et al. |
| 2003/0195883 A1 | 10/2003 | Mojsilovic et al. |
| 2003/0229900 A1 | 12/2003 | Reisman |
| 2004/0022447 A1 | 2/2004 | Mukhopadhyay et al. |
| 2004/0085339 A1 | 5/2004 | Divakaran et al. |
| 2004/0221237 A1 | 11/2004 | Foote et al. |
| 2004/0260786 A1 | 12/2004 | Barile |
| 2005/0125368 A1 | 6/2005 | Akahori |
| 2005/0251532 A1 | 11/2005 | Radhakrishnan et al. |
| 2005/0262245 A1 | 11/2005 | Menon et al. |
| 2005/0289347 A1 | 12/2005 | Ovadia |
| 2006/0029253 A1 | 2/2006 | Pace |
| 2006/0101060 A1 | 5/2006 | Li et al. |
| 2006/0111801 A1 | 5/2006 | Weare et al. |
| 2006/0271973 A1 | 11/2006 | Jerding et al. |
| 2006/0279628 A1 | 12/2006 | Fleming |
| 2006/0291690 A1 | 12/2006 | Roberts |
| 2007/0025606 A1 | 2/2007 | Gholap et al. |
| 2007/0128899 A1 | 6/2007 | Mayer |
| 2007/0157231 A1 | 7/2007 | Eldering et al. |
| 2007/0217676 A1 | 9/2007 | Grauman et al. |
| 2007/0253594 A1 | 11/2007 | Lu et al. |
| 2007/0282898 A1 | 12/2007 | Stark et al. |
| 2008/0027931 A1 | 1/2008 | Lu et al. |
| 2008/0040807 A1 | 2/2008 | Lu et al. |
| 2008/0123976 A1 | 5/2008 | Coombs et al. |
| 2008/0166057 A1 | 7/2008 | Nakajima |
| 2008/0186413 A1 | 8/2008 | Someya et al. |
| 2008/0271080 A1 | 10/2008 | Gossweiler et al. |
| 2009/0074235 A1 | 3/2009 | Lahr et al. |
| 2009/0113512 A1 | 4/2009 | Collet et al. |
| 2009/0193473 A1 | 7/2009 | Moon et al. |
| 2009/0204901 A1 | 8/2009 | Dharmaji et al. |
| 2009/0324026 A1 | 12/2009 | Kletter |
| 2010/0162330 A1 | 6/2010 | Herlein et al. |
| 2010/0299438 A1 | 11/2010 | Zimmerman et al. |
| 2011/0078551 A1 | 3/2011 | Zhang et al. |
| 2011/0191692 A1 | 8/2011 | Walsh et al. |
| 2011/0219035 A1 | 9/2011 | Korsunsky et al. |
| 2011/0314493 A1 | 12/2011 | Lemire et al. |
| 2012/0159337 A1 | 6/2012 | Travilla et al. |
| 2012/0216121 A1 | 8/2012 | Lin et al. |
| 2012/0240176 A1* | 9/2012 | Ma ............... H04N 21/23439 |
| | | 725/114 |
| 2012/0275597 A1 | 11/2012 | Knox et al. |
| 2013/0163758 A1 | 6/2013 | Swaminathan et al. |
| 2013/0195204 A1 | 8/2013 | Reznik et al. |
| 2013/0291002 A1* | 10/2013 | Rothschild ......... H04N 21/258 |
| | | 725/25 |
| 2013/0311780 A1 | 11/2013 | Besehanic |
| 2014/0095890 A1 | 4/2014 | Mangalore et al. |
| 2014/0115060 A1 | 4/2014 | Kim et al. |
| 2014/0201334 A1 | 7/2014 | Wang et al. |
| 2014/0259051 A1 | 9/2014 | Strein et al. |
| 2014/0280781 A1 | 9/2014 | Gregotski |
| 2015/0058709 A1 | 2/2015 | Zaletel |
| 2015/0074232 A1 | 3/2015 | Phillips et al. |
| 2015/0113021 A1 | 4/2015 | Martin |
| 2015/0172342 A1 | 6/2015 | Yin |
| 2015/0208103 A1 | 7/2015 | Guntur et al. |
| 2015/0346832 A1 | 12/2015 | Cole et al. |
| 2015/0365622 A1 | 12/2015 | Ushiyama |
| 2015/0365725 A1 | 12/2015 | Belyaev et al. |
| 2015/0382042 A1 | 12/2015 | Wagenaar et al. |
| 2016/0065946 A1 | 3/2016 | Cole et al. |
| 2016/0080470 A1 | 3/2016 | Shanson |
| 2016/0080810 A1 | 3/2016 | Dutta et al. |
| 2016/0127260 A1 | 5/2016 | Gordon |
| 2016/0127440 A1* | 5/2016 | Gordon ............ H04N 21/23439 |
| | | 709/219 |
| 2016/0134910 A1 | 5/2016 | Davis et al. |
| 2016/0149699 A1 | 5/2016 | Gauda |
| 2016/0173961 A1 | 6/2016 | Coan et al. |
| 2016/0198202 A1* | 7/2016 | Van Brandenburg ...................... |
| | | H04N 21/26258 |
| | | 725/31 |
| 2016/0224799 A1 | 8/2016 | Uzun et al. |
| 2016/0227279 A1 | 8/2016 | Fang et al. |
| 2016/0316233 A1 | 10/2016 | Ghadi et al. |
| 2016/0337704 A1 | 11/2016 | Binder et al. |
| 2017/0064400 A1 | 3/2017 | Riegel et al. |
| 2017/0070758 A1 | 3/2017 | Phillips et al. |
| 2017/0085933 A1 | 3/2017 | Czeck, Jr. et al. |
| 2017/0150190 A1 | 5/2017 | Tarbox et al. |
| 2017/0280181 A1* | 9/2017 | Ramaley ............ H04N 21/2662 |
| 2017/0302753 A1 | 10/2017 | Larumbe et al. |
| 2017/0308681 A1 | 10/2017 | Gould et al. |
| 2017/0353516 A1 | 12/2017 | Gordon |
| 2018/0063594 A1 | 3/2018 | Alexander et al. |

FOREIGN PATENT DOCUMENTS

| | | |
|---|---|---|
| CN | 101689184 A | 3/2010 |
| CN | 103491457 A | 1/2014 |
| WO | 2006/122320 | 11/2006 |
| WO | 2007/148290 | 12/2007 |

OTHER PUBLICATIONS

K. Mificak and R. Venkatesan, "Blind Image Watermarking Via Derivation and Quantization of Robust Semi-Global Statistics", in IEEE International Conference on Acoustics, Speech and Signal Processing, 2002, (4 pages).

T. Lindeberg, "Feature Detection with Automatic Scale Selection", International Journal of Computer Vision, vol. 30, No. 2, 1998, pp. 1-51.

A. Andoni and P. Indyk, "Near-Optimal Hashing Algorithms for Approximate Nearest Neighbor in High Dimensions", in Proceedings of the Symposium on Foundations of Computer Science, Jan. 2006, 10 pages.

A. Joly, O. Buisson and C. Frelicot, "Content-based Copy Retrieval using Distortion-based Probabilistic Similarity Search", IEEE Transactions on Multimedia, vol. 9, No. 2, p. 1-14, Feb. 2007.

(56) References Cited

OTHER PUBLICATIONS

J. Matas, O. Chum, M. Urban, T. Pajdla, "Robust Wide Baseline Stereo from Maximally Stable Extremal Regions", in British Machine Vision Conference., 2002, pp. 384-393.
K. Mikolajczyk and C. Schmid, "Indexing based on scale invariant interest points", in Proc. ICCV, 2001, 7 pages.
Chinese Patent Application No. 201780011326.6, Office Action dated Mar. 9, 2020, 6 pages.
Chinese Patent Application No. 201780011328.5, Office Action dated Mar. 9, 2020, 8 pages.

* cited by examiner

FIG. 1

EXTM3U
EXT-X-MEDIA:TYPE=AUDIO,GROUP-ID="master_broadcast",LANGUAGE="eng",NAME=Master Audio",AUTOSELECT=YES,DEFAULT=YES
EXT-X-STREAM-INF:PROGRAM-ID=1,BANDWIDTH=126400,AUDIO="master_broadcast"
http://www.cdn.com/server/play/fs1stgenc/1264000/prog.m3u8
EXT-X-STREAM-INF:PROGRAM-ID=1,BANDWIDTH=864000,AUDIO="master_broadcast"
http://www.cdn.com/server/play/fs1stgenc/864000/prog.m3u8

FIG. 2

EXTM3U
EXT-X-VERSION: 2
EXT-X-TARGETDURATION: 10
EXT-X-MEDIA-SEQUENCE: 1
EXT-X-DISCONTINUITY-SEQUENCE: 0
CUSTOM-SEGMENT-INFO: type=slate
EXTINF: 10, 1:0
http://www.videolocation.com/221234/wnbcx/1296k/03sydXBLiFd/144346/segment_144346374.ts
EXTINF: 10, 2:0
http://www.videolocation.com/221234/wnbcx/1296k/03sydXBLiFd/144346/segment_144346375.ts
EXTINF: 10, 3:0
http://www.videolocation.com/221234/wnbcx/1296k/03sydXBLiFd/144346/segment_144346376.ts
EXTINF: 10, 4:0
http://www.videolocation.com/221234/wnbcx/1296k/03sydXBLiFd/144346/segment_144346377.ts
EXTINF: 10, 5:0
http://www.videolocation.com/221234/wnbcx/1296k/03sydXBLiFd/144346/segment_144346378.ts

FIG. 3

```
#EXTM3U
EXT-X-MEDIA:TYPE=AUDIO,GROUP-ID="master_broadcast",LANGUAGE="eng",NAME=Master Audio",AUTOSELECT=YES,DEFAULT=YES
#EXT-X-STREAM-INF:PROGRAM-ID=1,BANDWIDTH=1264000,AUDIO="master_broadcast"
http://www.cdn.com/server/play/fs1stgenc/1264000/prog.m3u8?cdn=akamai
#EXT-X-STREAM-INF:PROGRAM-ID=1,BANDWIDTH=1264000,AUDIO="master_broadcast"
http://www.cdn.com/server/play/fs1stgenc/1264000/prog.m3u8?cdn=level3
#EXT-X-STREAM-INF:PROGRAM-ID=1,BANDWIDTH=864000,AUDIO="master_broadcast"
http://www.cdn.com/server/play/fs1stgenc/864000/prog.m3u8?cdn=akamai
#EXT-X-STREAM-INF:PROGRAM-ID=1,BANDWIDTH=864000,AUDIO="master_broadcast"
http://www.cdn.com/server/play/fs1stgenc/864000/prog.m3u8?cdn=level3
```

FIG. 4

CDN 1:
```
#EXTM3U
EXT-X-VERSION: 2
EXT-X-TARGETDURATION: 10
EXT-X-MEDIA-SEQUENCE: 1
EXT-X-DISCONTINUITY-SEQUENCE: 0
CUSTOM-SEGMENT-INFO: type=slate
EXTINF: 10, 1:0
http://www.videolocation1.com/221234/wnbcx/1296k/03sydXBLiFd/144346/segment_144346374.ts
#EXTINF: 10, 2:0
http://www.videolocation1.com/221234/wnbcx/1296k/03sydXBLiFd/144346/segment_144346375.ts
#EXTINF: 10, 3:0
http://www.videolocation1.com/221234/wnbcx/1296k/03sydXBLiFd/144346/segment_144346376.ts
#EXTINF: 10, 4:0
http://www.videolocation1.com/221234/wnbcx/1296k/03sydXBLiFd/144346/segment_144346377.ts
```

CDN 2:
```
#EXTM3U
EXT-X-VERSION: 2
EXT-X-TARGETDURATION: 10
EXT-X-MEDIA-SEQUENCE: 1
EXT-X-DISCONTINUITY-SEQUENCE: 0
CUSTOM-SEGMENT-INFO: type=slate
EXTINF: 10, 1:0
http://www.videolocation2.com/wnbcx/1296k/03sydXBLiFd/144346/segment_144346374.ts
#EXTINF: 10, 2:0
http://www.videolocation2.com/wnbcx/1296k/03sydXBLiFd/144346/segment_144346375.ts
#EXTINF: 10, 3:0
http://www.videolocation2.com/wnbcx/1296k/03sydXBLiFd/144346/segment_144346376.ts
#EXTINF: 10, 4:0
http://www.videolocation2.com/wnbcx/1296k/03sydXBLiFd/144346/segment_144346377.ts
```

FIG. 8

METHOD AND APPARATUS FOR SERVER-SIDE CONTENT DELIVERY NETWORK SWITCHING

CROSS-REFERENCE TO RELATED APPLICATIONS

This application claims priority to U.S. provisional application Ser. No. 62/334,064, filed May 10, 2016 and titled Method and Apparatus for Server-Side Content Delivery Network, the entire contents of which is incorporated herein by reference.

BACKGROUND

The subject matter disclosed herein relates to a method and apparatus for dynamically switching video segment locations such as content delivery networks (CDNs) during live content/ad manipulation. More specifically, a method and apparatus for leveraging per-user video manifest delivery to determine a CDNs performance and track a player's CDN switch logic is disclosed.

Video streaming allows video content to be delivered to a video player via the Internet. The video content is a video signal generated by a content provider for distribution to video consumers. The video signal may be provided in an uncompressed file format, such as a serial digital interface (SDI) format, or in a compressed format, such as a Moving Picture Experts Group (MPEG) file format or Transport Stream (TS) file format. The video signal is sent to an encoder which converts the file into a live streaming signal. The live streaming signal is preferably a segmented data stream that may be transmitted using standard Hypertext Transport Protocol (HTTP) over the internet. The live streaming signal may include multiple streams, where each stream may have a different data rate and/or different resolution.

Two common formats for the live streaming signal include HTTP Live Streaming (HLS) implemented by Apple® and MPEG-Dynamic Adaptive bitrate Streaming over HTTP (MPEG-DASH) implemented, for example by web browsers such as Chrome®, Microsoft Edge®, and Firefox®. In addition to the segmented data stream, the encoder generates a manifest file. The manifest file contains information for a video player to play the segmented data stream such as the data rate and resolution of each stream and a playlist providing an address from which the video content may be retrieved. Historically, the encoder has generated a single manifest file for each encoded video signal, where the manifest file is distributed along with the streaming signal.

The live streaming signal and the manifest file are stored in one or more Content Delivery Networks (CDN). Each CDN includes a number of edge servers which store the streaming signal and manifest file until requested by a video player. When the streaming signal is provided via to multiple CDNs, the CDNs may be in different geographic locations, such as the West Coast, East Coast or Midwest. Each video player may select a CDN based, among other things, on its geographic proximity in order to reduce transmission latencies.

The video player may be any suitable electronic device to receive the streaming signal such as a desktop computer, a television, a laptop computer, a tablet, or a mobile phone. A user initiates a request to view desired video content on the video player. The video player includes video management software executing on the video player which has knowledge of the address of the CDN and which may provide a list of video content stored on the CDN to the user. After the user has selected a desired video, the video player, in turn, requests that the video content be transmitted from the CDN.

During playback, transmission from a particular CDN may be interrupted or delayed for a number of reasons such as network traffic delays, power outages, etc. When there is a CDN failure and video segments cannot be loaded to the video player, the video players typically either stop playing the video stream or utilize failover capabilities.

To improve on this method, some video players which implement specific standards, such as HLS and MPEG dash standards, are configured to switch from the failed stream to an alternative failover stream, typically distributed from a different CDN or a different geographic location for the same CDN. This type of switching method occurs at the video player and is typically not reported by the player to any other systems in the video streaming environment. Some players may include additional reporting software to communicate with back-end servers. However, this type of player typically requires that the user download additional software that is not typically pre-installed on players. Further, to communicate the failure, players using this additional reporting software and back-end servers receiving the reporting must both be configured for such communication. Yet further, such communication increases network traffic for both systems.

What is needed is a method and apparatus for dynamically switching video segment locations during content provision without requiring additional software or communications for video players. What is further needed is such a method and apparatus that improves delivery of content to video players.

BRIEF DESCRIPTION

The subject matter disclosed herein describes a method and apparatus for dynamically switching video segment locations (CDNS) during live content/ad manipulation in a completely transparent way to video players. The method and apparatus is configured to use a per-user video manifest delivery to track CDN performance based on CDN switch logic from received manifest/playlist requests. Based on the tracked CDN performance, the per-user video manifest can be modified prior to the next delivery to improve overall performance. In one aspect, the CDN performance may be determined by aggregating the information in the received manifest/playlist requests from multiple video players.

In one embodiment of the disclosure, a computer implemented method embodied in a computer program stored in non-transient memory and executed by a computer processor for dynamically switching between content delivery networks based on network performance includes providing a manifest file specifying delivery of video content to a video player primarily from a first content delivery network and alternatively from an alternative content delivery network, determining that video content has been requested from the alternative content delivery network, updating network performance tracking for the first content delivery network based on the determination, and providing an updated manifest file based on the updated network performance tracking.

According to another aspect of the disclosure, the determination that video content has been requested from the alternative content delivery network is based on a request from a video player listing a URL address for the alternative content delivery network. Alternatively, the determination that video content has been requested from the alternative content delivery network is based on a request from a video player.

According to another aspect of the disclosure, updating network performance tracking for the first content delivery network further includes aggregating determinations that video content has been requested from the alternative content delivery network for a plurality of video players.

In another aspect, the updated manifest file includes first and alternative content delivery networks selected based on network performance tracking data for a plurality of content delivery networks. In this aspect, the first content delivery network in the updated manifest file may be the alternative content delivery network in the original manifest file.

According to another embodiment of the disclosure, a computer implemented system embodied in a computer program stored in non-transient memory and executed by a computer processor for providing an manifest file includes a manifest server operative to generate a unique manifest file per request for a video file stored on a content delivery network, the manifest file specifying delivery of video content to a video player primarily from a first content delivery network and alternatively from an alternative content delivery network and a content delivery network performance tracking system. The content delivery network performance tracking system track requests from the alternative content delivery network, updates network performance tracking for the first content delivery network based on the determination, and provides an updated manifest file based on the updated network performance tracking.

According to another embodiment of the disclosure, a computer implemented method embodied in a computer program stored in non-transient memory and executed by a computer processor for dynamically switching between content delivery networks based on network performance is described. The method includes providing a manifest file specifying delivery of video content to a video player primarily from a first content delivery network and alternatively from an alternative content delivery network, determining that video content has been requested from the alternative content delivery network, updating network performance tracking for the first content delivery network based on the determination, and providing an updated manifest file including the alternative content delivery network as an updated first content delivery network and a new content delivery network selected based on network performance tracking updates received for a plurality of content delivery networks.

In one aspect of the disclosure, the plurality of content delivery networks are selected content delivery networks identified based on at least one of geographic location and delivery network performance.

These and other objects, advantages, and features of the disclosure will become apparent to those skilled in the art from the detailed description and the accompanying drawings. It should be understood, however, that the detailed description and accompanying drawings, while indicating preferred embodiments of the present disclosure, are given by way of illustration and not of limitation. Many changes and modifications may be made within the scope of the present disclosure without departing from the spirit thereof, and the disclosure includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which:

FIG. 4 is a segment illustrating a portion of the content of a master playlist having two alternative failover renditions, according to an exemplary embodiment; and FIG. 5 is an exemplary manifest file including both primary stream and failover streams, according to one embodiment of the disclosure;

In describing the preferred embodiments of the disclosure which are illustrated in the drawings, specific terminology will be resorted to for the sake of clarity. However, it is not intended that the disclosure be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
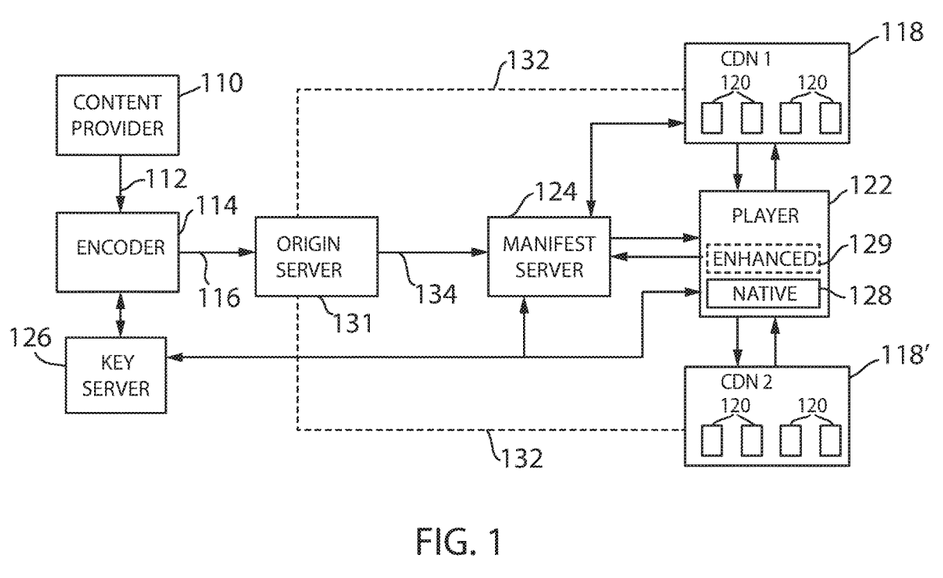
FIG. 1 is a block diagram representation of an exemplary environment incorporating a method for dynamic CDN switching, according to an exemplary embodiment.

Referring initially to FIG. 1, an exemplary environment for providing secure manifest file generation and playback is illustrated. A content provider 110 generates a video signal 112 to be distributed to video consumers. The video signal may be provided in an uncompressed file format, such as a SDI format, or in a compressed format, such as an MPEG or TS file format. The video signal 112 is sent to an encoder 114 which converts the file into a live streaming signal 116. The live streaming signal 116 is preferably a segmented data stream that may be transmitted using standard HTTP or HTTPS protocol over the internet. The live streaming signal 116 may include multiple streams, where each stream may have a different data rate and/or different resolution. The format of the live streaming signal may be, but is not limited to, HLS or MPEG-DASH. Still other protocols such as HTTP Dynamic Streaming (HDS) from Adobe® or Microsoft® Smooth Streaming and the like may be used without deviating from the scope of the disclosure.

In addition to the segmented data stream, the encoder generates a manifest file. The manifest file contains information for a video player 122 to play the segmented data stream such as the data rate and resolution of each stream and a playlist providing an address from which the video content may be retrieved. The encoder 114 generates a single manifest file for each encoded video signal, where the manifest file is distributed along with the streaming signal 116 to a video origin server 131. The manifest files are updated periodically, for example every 10 seconds in one exemplary embodiment, and new segment files are uploaded to the video origin server 131. According to an alternative embodiment, the encoder 114 may be configured to upload manifests file and segment files directly to CDNs 118.

CDNs 118 periodically access video origin server 131 and upload video segments files such that the video segment files will be stored on a plurality of CDNs 118. The manifest file may include an address of each CDN such that playback may occur from any of the CDNs 118. Each CDN 118 includes a number of edge servers 120 which store the encoded video signal 116 and manifest file until playback of the video content is requested by a video player 122. Manifest files include two types of playlists, master playlists and rendition playlists.

Figure 2:
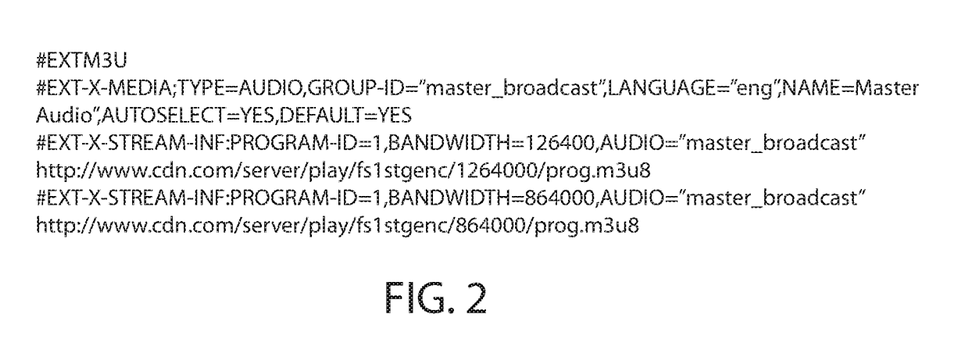
FIG. 2 is a segment illustrating a portion of the content that may be available in the first type of video manifest file, according to an exemplary embodiment.

Referring first to FIG. 2, a segment illustrating a portion of the content that may be available in the first type of video manifest file, referred to hereinafter as a master playlist, is shown according to an exemplary embodiment. The master playlist file includes a list of rendition file locations and their attributes (e.g., video screen size, encoding type, language, average and max bitrate, etc.) for the specific rendition.

Figure 3:
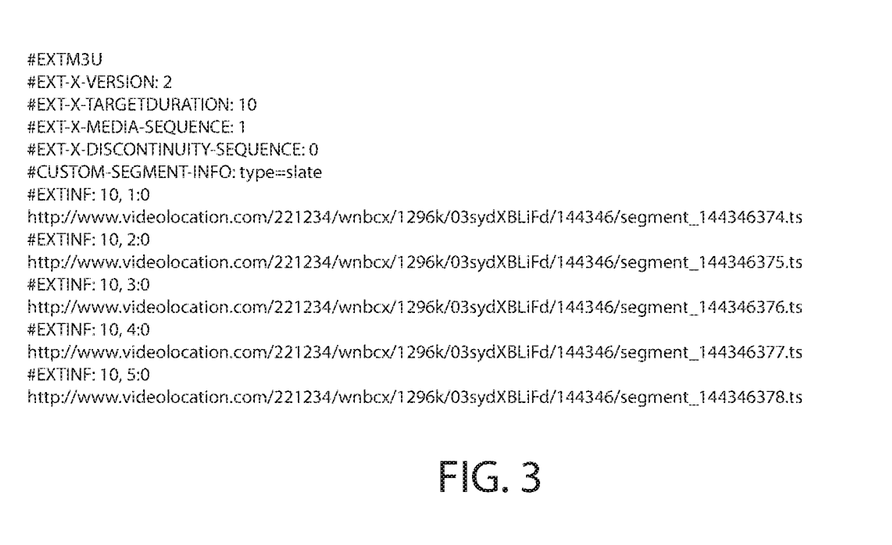
FIG. 3 is a segment illustrating a portion of the content that may be available in the second type of a rendition playlist, according to an exemplary embodiment.

Referring now to FIG. 3, a segment illustrating a portion of the content that may be available in the second type of video manifest file, referred to hereinafter as a rendition playlist, is shown according to an exemplary embodiment. Each rendition playlist includes a listing of video segments and their locations. For example, FIG. 3 identifies five different segments of the streaming signal 116 and the location where each segment may be retrieved by the video player 122.

Video players 122 load the segment files for selected renditions and plays the segment files of that selected rendition. If a CDN1 118 has an issue and the video player 122 cannot load a segment file listed in the rendition playlist, video players 122 switch to another rendition and load the corresponding segment from the other rendition to maintain the provision of a video stream. For example, where a CDN1 118 cannot provide a high-resolution segment based on detected network traffic, the CDN1 118 will provide a lower resolution rendition to maintain the provision of a video stream. If all renditions have issues, the video player 122 will typically stop playback a report an error to an application on the player 122.

Where there is an error in providing all renditions, CDNs 118 distribute the video segment from their edge-servers 120 and will try to direct video players 122 to load video segment from their closest edge server 120. In this case, each user may be the same video segment from a different edge-server 120. Edge servers 122 are typically distributed geographically in data centers. For example, for the same video segment, a video player 122 for a user in California may obtain the video segment for an edge server 120 in a data center in California, while a video player 122 for a user in New York may obtain the video segment for an edge server 120 in an East Coast data center.

However, as further illustrated in FIG. 1, the exemplary environment includes a manifest server 124. The manifest server 124 is used to provide a unique manifest file, also referred to herein as a per-user manifest file, to each video player 122 for each requested video content. Each video player 122 may include a native video player module 128 which provides an interface to a user and which manages video playback on the device 122. Some video players 122 may further include an enhanced video player module 129, illustrated as an optional module in FIG. 1. The enhanced video player module 129 may be a plug-in or other software module executing on the video player 122 that either complements (i.e., adds additional capabilities) or replaces (i.e., adds additional capabilities and incorporates the video interface and playback capabilities) the native video player module 128. When a user requests video content for playback on the video device 122, the native or enhanced video player module 129 communicates with a manifest server 124 rather than the CDN 118 to obtain the manifest files for video playback. The manifest server 124 manages the retrieval and delivery of the manifest file generated by the encoder 114 through the video origin server 131 to provide the unique manifest file to each video player 122.

A master playlist may be configured to include alternative failover renditions in a list for each rendition. Referring now also to FIG. 4, a segment illustrating a portion of the content of a master playlist having two alternative failover renditions is shown, according to an exemplary embodiment. Some players 122 may use this type of master playlist such that if one rendition has an issue where a video player 122 cannot load segment file from a CDN1 118, the video player 122 switches to an alternative rendition for the same bit rate from a different CDN2 118' or different geographical region or different CDN's edge server. This will allow the video player 122 to continue providing the video stream without interruption but does not allow the video player 122 to remove the CDNs failed rendition and switch to another rendition. Advantageously, per user master playlist can be used to overcome this issue and facilitate dynamic switching between video segment locations during live content/ad manipulation in a way that is independent of the player 122 as described below.

Figure 6:
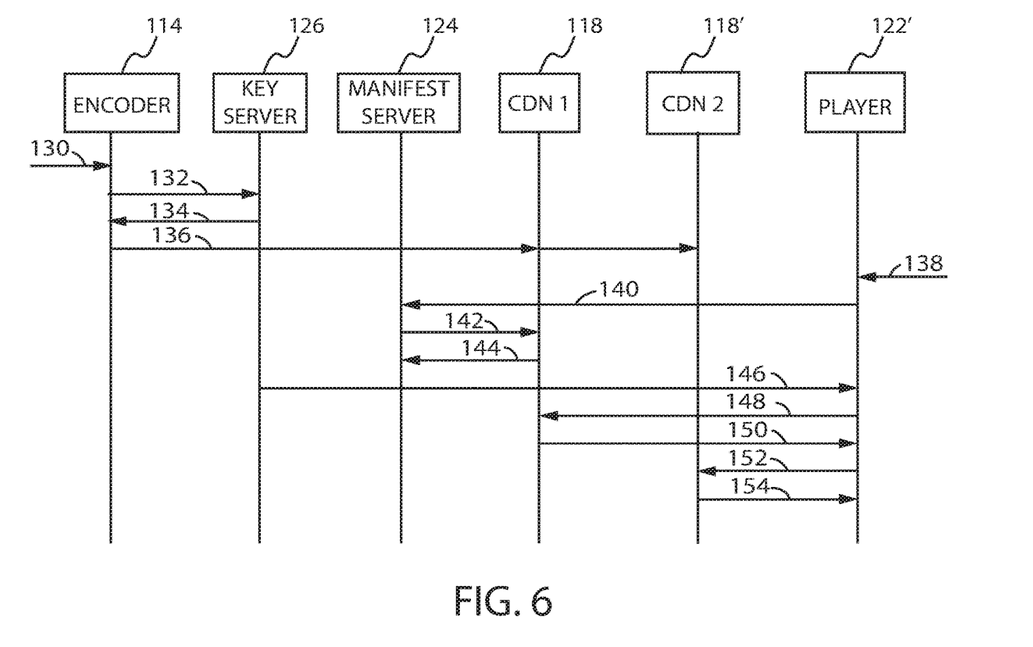
FIG. 6 is a flow diagram illustrating the implementing of dynamic CDN switching, according to one embodiment of the disclosure.

Turning next to FIG. 6, the operations performed to implement dynamic switching between video segment locations during live content/ad manipulation are illustrated. At block 130, the encoder 114 receives the initial video signal 112. It is contemplated that this video signal 112 may be a pre-recorded signal, such as an episode of a television show or a movie, or the video signal 112 may be a live stream, for example, of a sporting event, concert, or news feed. The encoder 114 converts the original video signal into a live streaming signal 116 suitable for delivery via HTTP or HTTPS. One operation in converting the video signal is to divide the video signal into segments. The segments may be, for example, 10 seconds in length. Optionally, other segment lengths, for example, from 1 second up to 10 seconds may be selected. The length of the video segment must be less than the maximum payload for an HTTP data packet.

After converting the video signal 112 into segments, the encoder 114 encrypts the video signals 112 to prevent unauthorized viewing of the video content. At block 132, the encoder 114 establishes communication with a key server 126 and requests a key to use for encrypting the segmented video signal 112. The key server 126 returns a key to the encoder 114 as shown in block 134. The key used to encrypt the segmented video signal 112 will be referred to herein as the content encryption key. The encoder 114 may use any suitable encryption protocol, such as the Advanced Encryption Standard (AES), to encrypt the segmented video signal using the content encryption key. The location of the key server and the encryption key used to encrypt the segmented video signal is included in a manifest file. The manifest file and the encrypted video signal are then transmitted to the video origin server 131 (not shown) and/or a plurality of CDN 118 for storage in one or more of the edge servers 120, as shown in block 136. Although the video signal is described herein as being an encrypted video signal, the video signal is not required to be encrypted in alternative embodiments.

At block 138, a user then requests playback of a desired video segment on the video player 122. The video player 122 may be any suitable electronic device to receive the streaming signal 116 such as a desktop computer, a television, a laptop computer, a tablet, Wi-Fi enabled device connected to a video screen, or a mobile phone. The video player 122 requests a manifest file from the manifest server 124 in order to retrieve the information necessary to play the requested video content.

When the video player 122 requests the manifest file from the manifest server 124 in block 140, a connection is established between the devices. A session identifier is also generated to identify the connection. The session identifier may be generated by the video player 122 or the manifest server 124. For purposes of illustration, it will be assumed that the session identifier is generated by the video player 122. The session identifier is transmitted to the manifest server 124 by the video player 122 when requesting a manifest file. The manifest server 124 then requests the manifest file from the CDN1 118 at block 142. At block 144, the CDN1 118 returns the manifest file to the manifest server 124.

Because the manifest server 124 has established a connection with video player 122, it may customize the manifest file prior to returning the manifest file to the video player 122 and provide a unique manifest file to each video player 122. Without the manifest server 124, the video player 122 retrieves the manifest file directly from the CDN1 118 and the content of the manifest file is the same for all users. However, because the manifest server 124 is providing a unique manifest file to each player, the manifest file may include identifying information of the video player 122, the user of the video player, or a combination thereof. Further, the manifest file may be modified to include content specific for the user.

Specifically, referring also to FIG. 5, a manifest file including both primary stream and failover streams may be delivered from the manifest server 124. Initially, manifest server 124 creates a manifest file including the primary CDN1 118 and other CDN2 118' failover streams renditions for delivery in block 146. The manifest file will have the address of the CDN1 118 in a URL as containing the segmented video content. Therefore, the video player can then start retrieving the video content from the CDN1. The video player 122 repeatedly requests the next segment in the playlist from the CDN1 118 and the CDN1 118 returns the requested segment as shown by blocks 148 and 150. The native video player module 128 then decodes the content from the encrypted video segments and displays the requested video content to the user.

Based on the block 148, since the URL of the rendition that is requested contains the CDN1 identifier and user identifier, manifest server 124 may be configured to determine and store which rendition (CDN1) is selected for the particular user and/or player 122. If there is no CDN1 segment delivery error, player 122 will continue providing video segments from the stored CDN1 and providing updated manifests listing the same CDN1 listing.

Where there is an issue with delivery of segments from a CDN1, player 122 will select the failover/alternate stream for rendition from the manifest file. The player 122 will request delivery of the alternative stream from CDN2 118' in block 152, delivered in block 154. Based on the request in block 152, manifest server 124 will be able to determine that the received request is for the failover/alternate stream and not the stored rendition/CDN. Specifically, the same URL will be provided except that CDN identifier will be different. The switch from the primary to the failover/alternate stream is registered as a rendition or CDN switch request indicative of a delivery error by the primary CDN1.

Since manifest server 124 records CDN requests per user, manifest server 124 may also record the geographic location of the user using IP to geolocation services. Accordingly, manifest server 124 can record CDN switch requests, requests per user, requests per geographical region, etc. This information may be aggregated in a central location or a single server with information for a large number of servers to determine performance statistics for any CDN 118.

Manifest server 124 may be configured to implement dynamic switching between CDNs 118. Manifest server 124 may be configured to switch CDNs upon detecting low CDN performance based on the aggregated per-user information. Specifically, manifest server 124 can modify one or more master playlists prior to delivery such that the low-performing CDN will not be utilized by players 122. Alternatively, upon receiving a request for a rendition manifest from a low performing CDN, manifest server 124 may be configured to deliver rendition of a CDN2 118' having better performance.

Referring now again to FIG. 1, CDNs periodically access origin server 131 to request video segment files. In block 132, CDNs 118 send the received video segment files to edge servers 120 for distribution to players 122. Similarly, manifest server 124 is configured to periodically request manifest/playlist files from the origin server 131 in block 134 to allow tracking of video streams and CDN switching. In another embodiment, where the origin server 131 is in use, manifest server may periodically load manifest files from CDNs location.

Advantageously, the method shown and described with reference to FIG. 6 allows the manifest server 124 to track CDN switches and enables dynamic switching between CDNs during live or video on demand (VOD) streaming. The method further does not require additional software be installed on players 122 nor additional communication between the players 122 and a back-end server.

Figure 7:
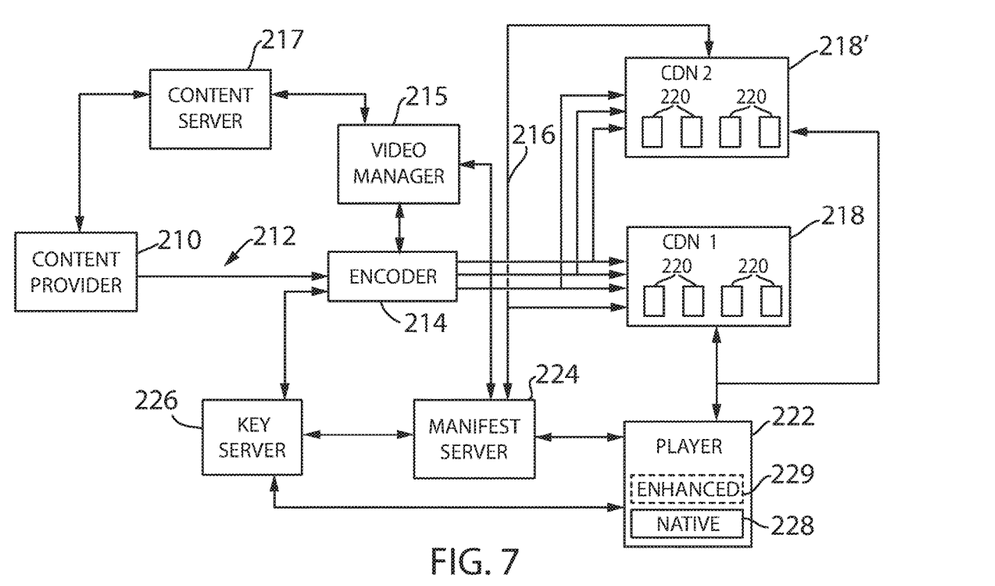
FIG. 7 is a block diagram representation of an exemplary environment incorporating a method for dynamic CDN switching, according to another embodiment.

Turning next to FIG. 7, according to another aspect of the disclosure, a content provider 210 generates a video signal 212 to be distributed to video consumers. The video signal may be provided in an uncompressed file format, such as a SDI format, or in a compressed format, such as an MPEG or TS file format. The video signal 212 is sent to an encoder 214 which converts the file into a live streaming signal 216. The live streaming signal 216 is preferably a segmented data stream that may be transmitted using standard HTTP or HTTPS protocol over the internet. The live streaming signal 216 may include multiple streams, where each stream may have a different data rate and/or different resolution. The format of the live streaming signal may be, but is not limited to, HLS or MPEG-DASH. Still other protocols such as HTTP Dynamic Streaming (HDS) from Adobe® or Microsoft® Smooth Streaming and the like may be used without deviating from the scope of the disclosure.

In addition to the segmented data stream, the encoder generates a manifest file. The manifest file contains information for a video player 222 to play the segmented data stream such as the data rate and resolution of each stream and a playlist providing an address from which the video content may be retrieved. The encoder 214 generates a single manifest file for each encoded video signal, where the manifest file is distributed along with the streaming signal 216 and stored on a CDN 218. It is noted that the "single" manifest file refers to a common or identical manifest file for each encoded signal. The manifest file may be comprised of multiple data files stored on the CDN where each manifest file contains a portion of the data required to playback the streaming signal. Further, for live streaming video, the manifest file may be updated and retransmitted at a periodic interval as new content is added from the live event. Although multiple files are used, the content generated by the encoder 214 for delivery to each video player 222 is the same. Each CDN 218 includes a number of edge servers 220 which store the encoded video signal 216 and manifest file until playback of the video content is requested by a video player 222. As shown in FIG. 7, the encoded video signal 216 may be stored on multiple CDNs 218. The manifest file may include an address of each CDN such that playback may occur from any of the CDNs 218.

As further illustrated in FIG. 7, the exemplary environment includes a manifest server 224. The manifest server 224 is used to provide a unique manifest file, also referred to herein as a per-user manifest file, to each video player 222 for each requested video content. Each video player 222 includes a native video player module 228 which provides an interface to a user and which manages video playback on the device 222. Some video players 222 may further include an enhanced video player module 229, illustrated as an optional module in FIG. 7. The enhanced video player module 229 may be a plug-in or other software module executing on the video player 222 that either complements (i.e., adds additional capabilities) or replaces (i.e., adds additional capabilities and incorporates the video interface and playback capabilities) the native video player module 228. As will be discussed in more detail below, when a user 225 requests video content for playback on the video device 222, the native or enhanced video player module 229 communicates with a manifest server 224 rather than the CDN 218 to obtain the manifest files for video playback. The manifest server 224 manages the retrieval and delivery of the manifest file generated by the encoder 214 to provide the unique manifest file to each video player 222.

The exemplary embodiment further includes a video manager 215 in communication with the encoder 214. The video manager 215 receives triggers included from the content provider in the video signal 212. The video manager 215 is also in communication with a content server 217 and the manifest server 224, where the content server 217 may store metadata generated by the content provider 210 and which was previously retrieved via out-of-band methods by the video player 222. According to one embodiment of the disclosure, the video manager 215 and the manifest server 224 are implemented on a single server. According to another embodiment of the disclosure, the video manager 215 and the manifest server 224 are implemented on separate servers. Because the manifest server 224 has established a per-user connection with each video player 222, as discussed in more detail below, the video manager 215 can identify content intended for individual video players 222 based on the per-user connection. Upon detecting a trigger in the video signal 212, the video manager 215 contacts the content server 217 to retrieve the metadata corresponding to the trigger that would otherwise need to be requested out-of-band by the video player 222. The metadata may be universal to all video players 222 or may be tailored, for example, to a geographic region or to a particular video player 222. Having retrieved the information, the video manager communicates the information to the encoder 214 where it may be included within the transport stream for delivery directly to the video player. Insertion of the information into the video stream is discussed in more detail below.

Figure 8:
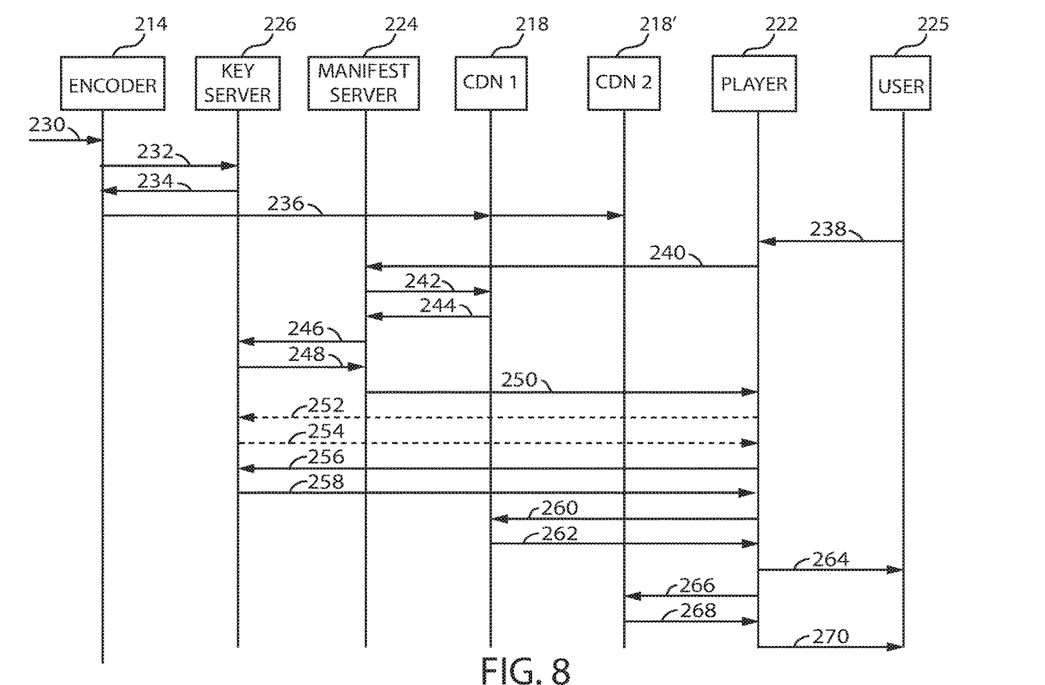
FIG. 8 is a flow diagram illustrating the implementing of dynamic CDN switching, according to another embodiment of the disclosure.

Turning next to FIG. 8, the operations performed to create, deliver, and playback a per-user manifest file are illustrated. At block 230, the encoder 214 receives the initial video signal 212. It is contemplated that this video signal 212 may be a pre-recorded signal, such as an episode of a television show or a movie, or the video signal 212 may be a live stream, for example, of a sporting event, concert, or news feed. The encoder 214 converts the original video signal into a live streaming signal 216 suitable for delivery via HTTP or HTTPS. One operation in converting the video signal is to divide the video signal into segments. The segments may be, for example, 10 seconds in length. Optionally, other segment lengths, for example, from 1 second up to 10 seconds may be selected. The length of the video segment must be less than the maximum payload for an HTTP data packet.

After converting the video signal 212 into segments, the encoder 214 can encrypt the video signals 212 to prevent unauthorized viewing of the video content. At block 232, the encoder 214 establishes communication with a key server 226 and requests a key to use for encrypting the segmented video signal 212. The key server 226 returns a key to the encoder 214 as shown in block 234. The key used to encrypt the segmented video signal 212 will be referred to herein as the content encryption key. The encoder 214 may use any suitable encryption protocol, such as the Advanced Encryption Standard (AES), to encrypt the segmented video signal using the content encryption key. The location of the key server and the encryption key used to encrypt the segmented video signal is included in a manifest file. The manifest file and the encrypted video signal are then transmitted to both of the CDN 218 for storage in one of their edge servers 220, as shown in block 236.

At block 238, a user 225 then requests playback of a desired video segment on the video player 222. The video player 222 may be any suitable electronic device to receive the streaming signal 216 such as a desktop computer, a television, a laptop computer, a tablet, Wi-Fi enabled device connected to a video screen, or a mobile phone. The video player 222 requests a manifest file from the manifest server 224 in order to retrieve the information necessary to play the requested video content. With reference again to FIGS. 2 and 3, segments of exemplary manifest files are illustrated that illustrate a portion of the content that may be available in a manifest file. The manifest file is a text file and the particular content on each line of the text file is identified by the directive at the start of the line. For example, FIG. 2 identifies two different streams in the streaming signal 216 where each stream has a different bandwidth. The location of a playlist for each of the streams is also included in the manifest file. FIG. 3 further shows a manifest file which contains a portion of the playlist of a video segment and provides the location of video segment in the CDN 218. The manifest file may include any information corresponding to the video stream, such as metadata information for the video stream.

When the video player 222 requests the manifest file from the manifest server 224 a connection is established between the devices. A session identifier is also generated to identify the connection. The session identifier may be generated by the video player 222 or the manifest server 224. For purposes of illustration, it will be assumed that the session identifier is generated by the video player 222. The session identifier is transmitted to the manifest server 224 by the video player 222 when requesting a manifest file. The manifest server 224 then requests the manifest file from a CDN1 218 at block 242. At block 244, the CDN1 218 receiving the request returns the manifest file to the manifest server 224.

Because the manifest server 224 has established a connection with video player 222, it may customize the manifest file prior to returning the manifest file to the video player 222 and provide a unique manifest file to each video player 222. Without the manifest server 224, the video player 222 retrieves the manifest file directly from the CDN 218 and the content of the manifest file is the same for all users. However, because the manifest server 224 is providing a unique manifest file to each player, the manifest file may include identifying information of the video player 222, the user 225 of the video player, or a combination thereof. Further, the manifest file may be modified to include content specific for the user 225.

The manifest server 224 is configured to generate and deliver the master file to include both primary stream and failover streams. Initially, manifest server 224 creates a manifest file including the primary CDN1 218 and other CDN2 218' failover streams renditions for delivery in block 246. The manifest file will have the address of the CDN1 218 in a URL as containing the segmented video content. Therefore, the video player can then start retrieving the video content from the CDN1. The video player 222 repeatedly requests the next segment in the playlist from the CDN1 218 and the CDN1 218 returns the requested segment as shown by blocks 260 and 262. The native video player module 228 then decodes the content from the encrypted video segments and displays the requested video content to the user.

The manifest server 224 may also be configured to generate an encryption key for each manifest file. The encryption key is generated as a function of the unique session identifier generated by the video player 222 when it requested the desired video content. Optionally, the encryption key may also be generated as a function of the requested video content. As a result, each encryption key is unique to a specific session with a particular video player, resulting in a one-time use unique encryption key. The one-time use unique encryption key will be referred to herein as the manifest encryption key. At block 246, the manifest server 224 transmits the manifest encryption key to the key server 226, and at block 248, the key server 226 acknowledges receipt of the manifest encryption key.

Optionally, the key server 226 may be configured to generate the manifest encryption key. At block 246, the manifest server 224 transmits the session identifier and an identifier corresponding to the desired video content to the key server rather than transferring the manifest encryption key. The key server 226 may then generate the manifest encryption key and, at block 248, return the manifest encryption key to the manifest server 224. After generating or obtaining the manifest encryption key, the manifest server 224 encrypts the manifest file prior to transmitting the manifest file to the video player 222. The manifest server 224 then transmits the encrypted manifest file to the video player 222, as shown at block 250.

Referring again to FIG. 7, if the video player 222 includes an enhanced video player module 229 from the provider of the manifest server 224, the enhanced video player module 229 may be configured to decrypt the encrypted manifest file directly. The manifest encryption key is encrypted in a manner known to both the manifest server 224 and the enhanced video player module 229. Therefore, the enhanced video player module 229 first decodes the manifest encryption key and then decodes the remainder of the manifest file using the manifest encryption key. If, however, the video player does not include an enhanced video player module 229 from the provider of the manifest server 224, the manifest server 224 may include a path to the key server 226, similar to that shown in FIG. 7, and the video player 222 requests the manifest encryption key from the key server 226 as shown in block 252. At block 254, the key server 226 returns the manifest encryption key to the video player 222, and the video player 222 decrypts the manifest file. Having decrypted the manifest file, either directly on the video player 222 with an enhanced video player module 229 or by requesting the manifest encryption key from the key server 226 and then utilizing the native video player module 228 to decode the manifest file, either the enhanced video player module 229 or the native video player module 228 next needs to decode the video content.

In some embodiments, the manifest file may remain unencrypted. When the manifest file is to remain unencrypted, the manifest server 224 may still generate a unique manifest file for the session with the video player 222. The operations in FIG. 8 process as discussed above from block 230 to block 244. However, rather than encoding the manifest file, the manifest server 224 skips blocks 246 and 248, transmitting an unencrypted manifest file to the video player at block 250.

If the video player 222 reads the manifest file and determines that the video content has been encrypted and, therefore, must still be decrypted, the video player module reads the location of the key server 226 for the content encryption key from the manifest file. It is contemplated that a single key server 226 may contain both the manifest encryption key and the content encryption key. Optionally, separate key servers 226 may be utilized for each of the encryption keys. The video player 222 requests the content encryption key from the key server 226 identified in the manifest file, as shown in block 256. At block 258, the key server 226 returns the content encryption key to the video player 222. The manifest file will have the address of the CDN 218 as containing the segmented video content. Therefore, the video player can then start retrieving the video content from the CDN. The video player 222 repeatedly requests the next segment in the playlist from the CDN 218 and the CDN returns the requested segment as shown by blocks 260 and 262. The native video player module 228 then decodes the content from the encrypted video segments and displays the requested video content to the user 225 in block 264.

Based on the block 260, since the URL of the rendition that is requested contains the CDN1 218 identifier and user identifier, manifest server 224 may be configured to determine and store which rendition (CDN1) is selected for the particular user and/or player 122. If there is no CDN1 segment delivery error, player 222 will continue providing video segments from the stored CDN1 and providing updated manifests listing the same CDN1 listing.

Where there is an issue with delivery of segments from a CDN1 218, player 222 will select the failover/alternate stream for rendition from the manifest file. The player 222 will request delivery of the alternative stream from CDN2 218' in a block 266, delivered in a block 268. Based on the request in block 266, manifest server 224 will be able to determine that the received request is for the failover/alternate stream and not the stored rendition/CDN. Specifically, the same URL will be provided except that the CDN identifier will be different. The switch from the primary to the failover/alternate stream is registered as a rendition or CDN switch request indicative of a delivery error by the primary CDN1. The native video player module 228 then decodes the content from the encrypted video segments and displays the requested video content to the user 225 in a block 270.

Portions of the disclosed embodiment are described herein as being implemented on various physical devices, including, but not limited to the video player 122, the manifest server 124, the key server 126, the encoder 114, the origin server 131, content server 217, video manager 215, or the edge server 120 within a CDN 118. It would be understood by one skilled in the art that these devices may include processing devices, such as a single microprocessor, multiple microprocessors, co-processors, application specific integrated circuits (ASICs), or other computing devices operating separately, in tandem, or a combination thereof. Further, each of these devices includes storage which may include transitory storage, non-transitory storage, or a combination thereof. The storage may include memory devices such as random access memory (RAM), read-only memory (ROM), solid state memory, and the like. The storage may further include devices configured to read removable storage medium such as CD-ROMs, DVDs, floppy disks, universal serial bus (USB) devices, memory cards, and the like. The processing devices may be configured to read and execute instructions stored in non-transitory storage to perform various operations in the methods described herein.

It should be understood that the disclosure is not limited in its application to the details of construction and arrangements of the components set forth herein. The disclosure is capable of other embodiments and of being practiced or carried out in various ways. Variations and modifications of the foregoing are within the scope of the present disclosure. It also being understood that the technology disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure.

What is claimed is:

1. A computer implemented method embodied in a computer program stored in non-transient memory and executed by a computer processor for dynamically switching between content delivery networks based on network performance, comprising:
   receiving, by a manifest server, a request for video content from a video player;
   obtaining, by the manifest server, a manifest file for the video content from a first content delivery network;
   customizing, by the manifest server, the manifest file for the video player requesting the video content;
   generating a manifest encryption key as a function of a session identifier identifying a connection between the manifest server and the video player;
   providing the manifest file customized for the video player and encrypted using the manifest encryption key, the customized manifest file identifying a plurality of playlists and at least one of the video player or a user of the video player, and also specifying delivery of the video content to the video player primarily from the first content delivery network and alternatively from an alternative content delivery network, wherein the plurality of playlists comprises (i) a master playlist indicating one or more renditions corresponding to the first content delivery network, and (ii) one or more rendition playlists that each specify a plurality of video segments for a respective rendition and a location of each of the plurality of video segments within the first content delivery network;
   determining that the video content has been requested from the alternative content delivery network, wherein a switch from the first content delivery network to the alternative content delivery network indicates a low performance of the first content delivery network;
   updating network performance tracking for the first content delivery network based on the determination; and
   modifying, based on the updated network performance tracking, the plurality of playlists in the manifest file to prevent the video player from utilizing the first content delivery network due to the low performance of the first content delivery network and to deliver a rendition corresponding to the alternative content delivery network having a higher performance than the first content delivery network.

2. The method of claim 1, wherein the determination that the video content has been requested from the alternative content delivery network is based on receipt of a request from the video player.

3. The method of claim 2, wherein the received request includes a request of delivery content from a URL address for the alternative content delivery network.

4. The method of claim 1, wherein updating network performance tracking for the first content delivery network further includes aggregating determinations that video content has been requested from the alternative content delivery network for a plurality of video players.

5. The method of claim 1, wherein an updated manifest file is provided, and wherein the updated manifest file includes first and alternative content delivery networks selected based on network performance tracking data for a plurality of content delivery networks.

6. The method of claim 5, wherein the first content delivery network in the updated manifest file is the alternative content delivery network in an original manifest file.

7. A computer implemented system for dynamically switching between content delivery networks, comprising:
   a memory; and
   a processor, coupled to the memory, to:
   receive, by a manifest server, a request for video content from a video player;
   obtain, by the manifest server, a manifest file for the video content from a first content delivery network;
   customize, by the manifest server, the manifest file for the video player requesting the video content;
   generate a manifest encryption key as a function of a session identifier identifying a connection between the manifest server and the video player;
   provide the manifest file customized for the video player and encrypted using the manifest encryption key, the customized manifest file identifying a plurality of playlists and at least one of the video player or a user of the video player, and also specifying delivery of the video content to the video player primarily from the first content delivery network and alternatively from an alternative content delivery network, wherein the plurality of playlists comprises (i) a master playlist indicating one or more renditions corresponding to the first content delivery network, and (ii) one or more rendition playlists that each specify a plurality of video segments for a respective rendition and a location of each of the plurality of video segments within the first content delivery network;

determine that the video content has been requested from the alternative content delivery network, wherein a switch from the first content delivery network to the alternative content delivery network indicates a low performance of the first content delivery network;

update network performance tracking for the first content delivery network based on the determination; and modify, based on the updated network performance tracking, the plurality of playlists in the manifest file to prevent the video player from utilizing the first content delivery network due to the low performance of the first content delivery network and to deliver a rendition corresponding to the alternative content delivery network having a higher performance than the first content delivery network.

8. The system of claim 7, further comprising an enhanced video player module of the video player, wherein the manifest server includes the encryption key in the customized manifest file, transmits the customized manifest file to the video player, and the enhanced video player module decrypts the customized manifest file using the encryption key included in the customized manifest file.

9. The system of claim 7, wherein determining that the video content has been requested from the alternative content delivery network is based on receipt of a request from the video player.

10. The system of claim 9, wherein the received request includes a request of delivery content from a URL address for the alternative content delivery network.

11. The system of claim 7, wherein updating network performance tracking for the first content delivery network further includes aggregating determinations that video content has been requested from the alternative content delivery network for a plurality of video players.

12. The system of claim 7, wherein an updated manifest file is provided, and wherein the updated manifest file includes first and alternative content delivery networks selected based on network performance tracking data for a plurality of content delivery networks.

13. The system of claim 12, wherein the first content delivery network in the updated manifest file is the alternative content delivery network in an original manifest file.

14. A non-transitory computer-readable medium, which when executed by a computer processor, cause the computer processor to perform operations for dynamically switching between content delivery networks based on network performance, the operations comprising:

receiving, by a manifest server, a request for video content from a video player;

obtaining, by the manifest server, a manifest file for the video content from a first content delivery network;

customizing, by the manifest server, the manifest file for the video player requesting the video content;

generating a manifest encryption key as a function of a session identifier identifying a connection between the manifest server and the video player;

providing the manifest file customized for the video player and encrypted using the manifest encryption key, the customized manifest file identifying a plurality of playlists and at least one of the video player or a user of the video player, and also specifying delivery of the video content to the video player primarily from the first content delivery network and alternatively from an alternative content delivery network, wherein the plurality of playlists comprises (i) a master playlist indicating one or more renditions corresponding to the first content delivery network, and (ii) one or more rendition playlists that each specify a plurality of video segments for a respective rendition and a location of each of the plurality of video segments within the first content delivery network;

determining that the video content has been requested from the alternative content delivery network, wherein a switch from the first content delivery network to the alternative content delivery network indicates a low performance of the first content delivery network;

updating network performance tracking for the first content delivery network based on the determination; and modifying, based on the updated network performance tracking, the plurality of playlists in the manifest file to prevent the video player from utilizing the first content delivery network due to the low performance of the first content delivery network and to deliver a rendition corresponding to the alternative content delivery network having a higher performance than the first content delivery network.

15. The non-transitory computer-readable medium of claim 14, wherein the determination that the video content has been requested from the alternative content delivery network is based on receipt of a request from the video player.

16. The non-transitory computer-readable medium of claim 15, wherein the received request includes a request of delivery content from a URL address for the alternative content delivery network.

17. The non-transitory computer-readable medium of claim 14, wherein updating network performance tracking for the first content delivery network further includes aggregating determinations that video content has been requested from the alternative content delivery network for a plurality of video players.

18. The method of claim 14, wherein an updated manifest file is provided, and wherein the updated manifest file includes first and alternative content delivery networks selected based on network performance tracking data for a plurality of content delivery networks.

19. The non-transitory computer-readable medium of claim 18, wherein the first content delivery network in the updated manifest file is the alternative content delivery network in an original manifest file.

20. The non-transitory computer-readable medium of claim 14, wherein the plurality of content delivery networks are selected content delivery networks identified based on at least one of geographic location and delivery network performance.

* * * * *